United States Patent Office 3,011,960
Patented Dec. 5, 1961

3,011,960
METHODS OF MANUFACTURING GRAPHITE BODIES AND NUCLEAR FUEL MATERIALS COMPRISING SAID GRAPHITE BODIES
Jack Williams, Abingdon, and David Thomas Livey, Harwell, England, assignors to United Kingdom Atomic Energy Authority, London, England
No Drawing. Filed June 25, 1958, Ser. No. 744,317
Claims priority, application Great Britain June 25, 1957
7 Claims. (Cl. 204—154.2)

The invention relates to methods of manufacturing graphite bodies and nuclear fuel materials comprising said graphite bodies.

More particularly, the invention relates to a method of manufacturing purified graphite bodies of high density, which bodies may also comprise nuclear fuel material.

Nuclear fuel material is here defined as fissile material, i.e. material which undergoes nuclear fission under the action of neutrons, or fertile material, i.e., material which will undergo similar fission after absorption of neutrons. Among fissile materials are those comprising uranium-235, uranium-233, and plutonium-239. Among fertile materials are those comprising thorium-232 and uranium-238. Natural uranium comprises both uranium-235 and uranium-238. Such fissile and fertile materials may be in the form of the pure metals, or compounds of the metals, such as their oxides or carbides.

It is an object of the present invention to provide a convenient method for the production of the said graphite bodies from powdered materials.

Purified graphite powder, i.e. graphite powder which has been produced by the disintegration of graphite bodies consisting of the highly purified synthetic graphite, known as pile graphite, required for use in nuclear reactors, cannot normally be compacted again into dense, compacted bodies by cold-compacting, without using a binder. This binder might reintroduce impurities into the graphite body and have other undesirable effects on the properties and characteristics of the graphite.

Natural, but impure, graphite powders, however, can be easily cold-compacted. It is believed that the ability of a graphite powder to be cold-compacted depends on several factors including the presence of impurities, the surface energy of the powder particles, the size of the particles, and the crystalline form of the particles. The inability of the purified graphite powder obtained from pile graphite to be cold-compacted is therefore due to a combination of these factors.

It has now been discovered that, if purified graphite powder obtained from pile graphite is first reduced to a very small particle size by grinding in a ball mill, or equivalent apparatus, for a sufficiently long period, it can be easily cold-compacted at pressures of about 20 tons per sq. in. or more, to give compacts of high density, e.g. 1.9 gm. per cc. or higher, and of reasonable strength. Such compacts are strong enough to be easily handled and have a compressive strength of up to about 1 ton/sq. in. Furthermore, if limited amounts of powdered nuclear fuel material, as hereinbefore defined, are incorporated into the graphite powder, compacts also of high relative density and reasonable strength are formed, which constitute highly desirable fuel materials for nuclear reactors. Such fuel materials comprise intimate dispersions of fissile and/or fertile material in graphite bodies, which are particularly suitable for use in nuclear reactors in which the fuel is subjected to very high temperatures, for example a high temperature gas cooled reactor as described in copending applications Nos. 651,409/57, now abandoned, 703,050/57 and 703,095/57.

According to the invention, a method of manufacturing a high density graphite body comprises cold-compacting highly purified synthetic graphite powder, said powder having been ground to a sufficiently small particle size to enable such cold-compacting to occur. In particular it has been found that, if grinding is continued until there are substantially no particles greater than 40 microns in diameter and at least 80% of the particles are smaller than 20 microns in diameter, then cold compacting at pressures of about 20 tons/sq. in. or above will produce dense compacts. A micron is equal to 0.001 of a millimetre.

Also according to the invention, a method of manufacturing a high density body comprising nuclear fuel material comprises cold-compacting an intimate mixture of highly purified synthetic graphite powder and a powdered nuclear fuel material, as hereinbefore defined, said fuel material comprising not more than about 50% by volume of the cold-compacted mixture, and said graphite having been ground to a sufficiently small particle size to enable such cold-compacting to occur. It has similarly been found that, if grinding of the graphite is continued until there are substantially no particles greater than about 40 microns in diameter and at least 80% of the particles are smaller than about 20 microns in diameter, then cold compacting at pressures of 20 tons/sq. in. or above will produce dense compacts.

Grinding of the graphite powder is preferably carried out in a ball mill containing porcelain or hardened steel balls of a suitable size, for example 1¼ inches in diameter. In such a mill, a grinding time of 45 hrs. has been found to reduce the particle size sufficiently to enable cold-compacting to take place.

Cold-compacting should be carried out at pressures of 20 tons/sq. in to 70 tons/sq. in. with a corresponding increase in compacted density. Compacting may be achieved by pressing in a die or by other methods. In particular hydrostatic pressing may be used, with the advantage of greater compacting efficiency than die pressing at the same pressure. It has been found that compacts prepared by cold-compacting by hydrostatic pressure are more uniform in their properties and have a somewhat greater density, than those produced by cold-compressing in a die at the same pressure. By using hydrostatic pressing methods, larger bodies may be formed, limited in size only by the size of press available. For example, long rods may be produced, consisting of graphite and fissile material in any of the forms hereinbefore specified. Such rods are suitable for incorporating in graphite-moderated reactors; the method of the invention is particularly suitable for producing rods containing enriched fissile materials, i.e. thermal "spikes" for such reactors, such "spikes" containing greater amounts of fissile material, e.g. $U_{235}$ of $Pu_{239}$ than the rest of the reactor fuel.

The presence of impurities picked up from the ball mill does not affect the cold-compacting properties of the ground pile graphite. Moreover, these impurities can be simply removed by leaching with hydrochloric acid which still does not affect the cold-compacting properties of the powder. Impurities are picked up only during the first run of graphite through the grinding mill, subsequent runs resulting in negligible pick-up.

The grinding time required to confer cold-compacting properties on the pile graphite depends on the size of the ball mill used, the weight of the graphite charge, and the weight and size of the balls used in the mill.

Nuclear fuel materials produced by the method of the invention may be conveniently formed as cylindrical rods; or as annular cylindrical sleeves which may be fitted over a graphite rod and covered by an outer graphite sleeve, to form a fuel element suitable to use in a high temperature gas cooled reactor as described in copending applications Nos. 651,409/57, now abandoned, 703,050/57 and 703,095/57.

Suitable fissile and/or fertile materials for incorporating with the graphite include uranium, thorium and plutonium metal powders, the corresponding dioxide powders, and the corresponding carbide powders. When the metals are used, they will be converted in situ in the reactor to the metal carbides if the temperature of their operation in the reactor exceeds 700° C. to 800° C.

The nature of the invention and preferred methods of carrying it in effect will be apparent from the following examples:

Example 1

250 gm. of machined pile graphite powder of high purity, having an ash content of only about 0.04% by weight, was ground in a rubber-lined ball mill 12 in. long and 8 in. in diameter containing 60 1¼ in. diameter steel balls. After grinding for 48 hrs. at a rotation speed of 45 r.p.m., the graphite was found to have picked up impurities, which increased its ash content to 0.7% by weight. Samples of this graphite powder were cold-compacted, in a cylindrical die with a corresponding ram, at 50 tons per sq. in. to give cylindrical compacts about ½ in. long and ½ in. in diameter. The compacts so formed had a mean density of about 1.9 gm./cc.

Example 2

A further 250 gm. of machined pile graphite was ground in the same mill under the same conditions as in Example 1. After grinding for 48 hrs., the graphite was found to have picked up a negligible amount of impurities. Samples of this graphite powder were compacted as in Example 1 and also gave compacts having a mean density of about 1.9 gm./cc.

Example 3

250 gm. of machined pile graphite was ground in a rubber-lined mill containing porcelain balls instead of steel balls. After grinding for 48 hrs., the graphite was found to have picked up impurities to an extent which increased its ash content to 2.1%. Samples of this graphite powder were compacted as in Example 1 and gave compacts having a density of 1.94 gm./cc.

Example 4

A further 250 gm. of machined pile graphite was ground in the same mill and under the same conditions as in Example 3. After grinding for 50 hrs., the graphite was found to have picked up less than 0.05% of impurities by weight. Samples of this graphite powder were compacted as in Example 1 and also gave compacts having a density of 1.94 gm./cc.

Example 5

Samples of the graphite powder, prepared by grinding according to the methods of Example 1 or Example 3, and containing substantial amounts of impurities, such as to increase their ash content to 0.7% and 2.1% respectively, were treated by boiling with hydrochloric acid. They were then found to be substantially decontaminated from the impurities picked up during grinding, their ash content being reduced to about 0.05%. After compacting as in Example 1, these treated samples gave compacts similar in density to those obtained in Examples 1 and 3 respectively.

Compacts produced by the methods of Examples 1 to 5 were all of sufficient strength to be easily handled and had a compressive strength of about 1 ton/sq. in. Machined pile graphite which had been ground for less than 18 hrs., however, could not be cold compacted. Grinding for periods between 18 hrs. and 45 hrs. yielded compacts of increasing strength and density; but compacts of density greater than 1.90 gm./cc. required a grinding time of at least 45 hrs. Grinding for longer periods did not produce any substantial further improvement in cold-compacting properties, but densities as high as 1.98 gm./cc. were achieved. This compares with the density of only about 1.7 gm./cc. possessed by pile graphite as manufactured.

The important effect of the grinding time, and the particle size distribution of the graphite powder, is shown in the following table in which are shown the densities of compacts produced by the methods of Examples 1 to 5, but ground for varying periods of time before cold-compacting and then compacted at 70 tons/sq. in. The particle size analysis was made with a light extinction sedimentometer.

| grinding time (hours) | percentage of particles | | | density, gm./cc. |
|---|---|---|---|---|
| | <20 microns | 20-40 microns | >40 microns | |
| 0 | <4 | --- | >96 | (¹) |
| 9 | 45 | 35 | 20 | (¹) |
| 18 | 56 | 44 | 0 | 1.45 |
| 27 | 71 | 29 | 0 | 1.58 |
| 45 | 82 | 18 | 0 | 1.91 |
| 54 | 87 | 13 | 0 | 1.95 |
| 63 | 88 | 12 | 0 | 1.96 |
| 72 | 91 | 9 | 0 | 1.98 |

¹ Did not compact.

It is apparent from these figures that a grinding time of at least 45 hours was necessary to produce a suitable particle size distribution to enable cold compacting to produce dense compacts.

The effect of compacting pressure is shown in the following table in which are shown the densities of compacts produced by the methods of Examples 1 to 5, but cold compacted at various pressures after grinding for 72 hours.

| Pressure, tons/sq. in.: | Density, gm./cc. |
|---|---|
| 5 | 1.56 |
| 10 | 1.72 |
| 20 | 1.86 |
| 30 | 1.93 |
| 40 | 1.94 |
| 50 | 1.97 |
| 60 | 1.98 |
| 70 | 1.98 |

Thus it is seen that pressures of at least 20 tons/sq. in. are necessary to give compacts of high density.

The following further examples relate to nuclear fuel materials prepared according to the invention.

Example 6

An intimate mixture was made of 6 gm. uranium metal powder and 12 gm. pile graphite powder prepared by grinding for 50 hours in a ball mill as in Example 2 or 4, or by grinding for 50 hours as in Example 1 or 3 and then treated as in Example 5. This mixture was then divided into 5 parts, each weighing about 3.6 gm. Each part was then cold-compacted in an annular die to give a compact having an outside diameter of 0.45 in. and an inside diameter of 0.20 in. and a length of approximately 0.4 in. The pressure used was between 30 and 40 tons/sq. in., and was adjusted so that the combined length of the five compacts was exactly 2 in. The five annular bodies so produced were dense, easily handled compacts suitable for incorporation in a nuclear fuel element, e.g. by mounting on a central graphite rod and enclosing within an outer graphite sleeve. The density of uranium metal being 18.3 gm./cc., the compacted volume of uranium in each compact was 0.066 cc. The mean volume of the compacts was 0.050 cu. in. (0.84 cc.); therefore the proportion of uranium in the compacted material was 8.5% by volume.

Example 7

An intimate mixture was made of 3 gm. uranium metal powder, 35 gm. thorium metal powder, and 90 gm. pile graphite powder prepared by grinding by any of the methods specified in Example 6. This mixture was then divided into twelve parts, each weighing about 10⅔ gm. Each part was then cold compacted in an annular die to give a compact having an outside diameter of 1.5 in., an inside diameter of 1.25 in., and a length of approximately 0.5 in. The pressure used was between 30 and 40 tons/sq. in., and was adjusted so that the combined length of the twelve compacts was exactly 6 in. The twelve annular bodies so produced were dense, easily handled compacts, suitable for incorporation in a nuclear fuel element as described in Example 6. The proportion of uranium in the compacted material was 0.31% by volume, and that of thorium was 5.8%. If the uranium metal used is enriched in the fissile isotope U–235, then such a fuel element is suitable for use in a high temperature gas-cooled reactor as described in co-pending applications Nos. 651,409/57, now abandoned, 703,-050/57 and 703,095/57.

*Example 8*

An intimate mixture was made of 6.85 gm. uranium dioxide powder, and 5.6 gm. pile graphite powder prepared by any of the methods specified in Example 6. This mixture was then divided into 5 parts, each weighing about 2.5 gm. Each part was then cold-compacted in an annular die to give a compact having the same dimensions as those of Example 6, using similar pressures of 30 to 40 tons/sq. in. The five annular bodies so produced were strong, unitary compacts, easily handled and suitable for incorporation in a nuclear fuel element, e.g., as in Example 6. The density of uranium dioxide being 10.0 gm./cc. the compacted volume of uranium dioxide in each compact was 0.137 cc. The mean volume of the compacts, as in Example 6, was 0.84 cc.; therefore the proportion of uranium dioxide in the compacted material was 16.3% by volume.

Compacts produced according to Examples 6, 7 and 8 were of similar strength to the graphite bodies produced as in Examples 1 to 5. Grinding of the pile graphite contained therein for less than 18 hours, however, did not yield unitary compacts, while grinding for periods from 18 hours to 48 hours yielded compacts of increasing strength and density, as in the case of graphite alone. The pressure at which compacting was carried out had an influence on the densities of the compacts. The following table shows the effect of compacting pressure on the density of compacts produced by the method of Example 7, but using different compacting pressures. The theoretical density of the mixture of uranium, thorium and graphite used is 2.96 gm./cc.

| pressure, tons/sq. in. | density, gm./cc. | percent of theoretical density |
|---|---|---|
| 10 | 2.14 | 72.2 |
| 20 | 2.30 | 77.7 |
| 30 | 2.35 | 79.4 |
| 40 | 2.41 | 81.4 |
| 50 | 2.45 | 82.8 |
| 60 | 2.47 | 83.4 |
| 70 | 2.49 | 84.1 |

Thus it is seen that densities 80% of theoretical can be achieved by using pressures greater than about 30 tons/sq. in.

In all of the Examples 1 to 8, above, cold-compacting of the graphite and graphite mixtures was carried out by pressing in a die. The cold-compacting may, however, be carried out by hydrostatic pressing, with the advantages hereinbefore mentioned. The following example describes the production of graphite bodies by hydrostatic pressing according to the present invention.

*Example 9*

Graphite powder was ground in a ball mill for 72 hrs. by any of the methods described in Examples 1 to 4, or further treated as in Example 5, and then compacted hydrostatically within a closed rubber tube supported externally by a perforated steel tube to form a rod 3 inches long and ¾ inch in diameter. Using a compacting pressure of 20 tons/sq. in. a density of 1.89 gm./cc. was achieved. This is slightly greater than the density of compacts produced by die pressing at the same pressure of 20 tons/sq. in. namely 1.86 gm./cc.

The compressive strength of compacts produced by hydrostatic pressure was about two-thirds that of compacts produced by die pressing. Their properties, however, were more uniformly maintained than die pressed compacts, and they showed less anisotropy than die pressed compacts.

We claim:

1. A method of manufacturing a dense, high purity, synthetic graphite body, which comprises the steps of grinding a high purity synthetic graphite powder until substantially all the particles of said powder are less than 40 microns in diameter and at least 80% of the particles are less than 20 microns in diameter, and then cold compacting said powder at a pressure of at least 20 tons per square inch.

2. A method as claimed in claim 1, in which said compacting is achieved by die pressing.

3. A method as claimed in claim 1, in which said compacting is achieved by hydrostatic pressing.

4. A method of manufacturing a dense body consisting of graphite, uranium metal, and thorium metal, comprising grinding a high purity synthetic graphite powder until substantially all the particles thereof are less than 40 microns in diameter and at least 80% of said particles are less than 20 microns in diameter, intimately mixing therewith thorium powder to form about 6% and uranium powder to form about 0.3% by volume of the mixture of said powders, and cold compacting said mixture at a pressure of at least 20 tons per square inch.

5. A method of manufacturing a dense body consisting of graphite and at least one material from the group consisting of uranium, plutonium, and thorium metals and the oxides and carbides thereof, comprising grinding a high purity synthetic graphite powder until substantially all the particles thereof are less than forty microns in diameter and at least 80% of said particles are less than twenty microns in diameter, intimately mixing therewith a powder of said material in amount not more than equal in volume to said graphite powder, and cold compacting the mixture of said powders at a pressure of at least twenty tons per square inch.

6. A method as claimed in claim 5 in which said cold-compacting is achieved by die pressing.

7. A method as claimed in claim 5 in which said cold-compacting is achieved by hydrostatic pressing.

References Cited in the file of this patent

TID–10001, Oct. 13, 1954, available from TIS, Industrial Reports Section, P.O. Box 1001, Oak Ridge, Tenn., price $0.45. (Copy in Library.)

International Conference on Peaceful Uses of Atomic Energy, 1955, vol. 8, pages 451–471, in particular page 456. (Copy in Library.)

AECD–4095, April 1950, in particular page 12, available from OTS, Dept. of Comm., Washington 25, D.C., price 25¢. (Copy in Library.)